Feb. 16, 1965   P. PATZ   3,169,620
SWINGABLE SILO SPOUT
Filed April 1, 1963   2 Sheets-Sheet 1

INVENTOR:
PAUL PATZ

BY:
Lieber & Nilles
ATTORNEYS

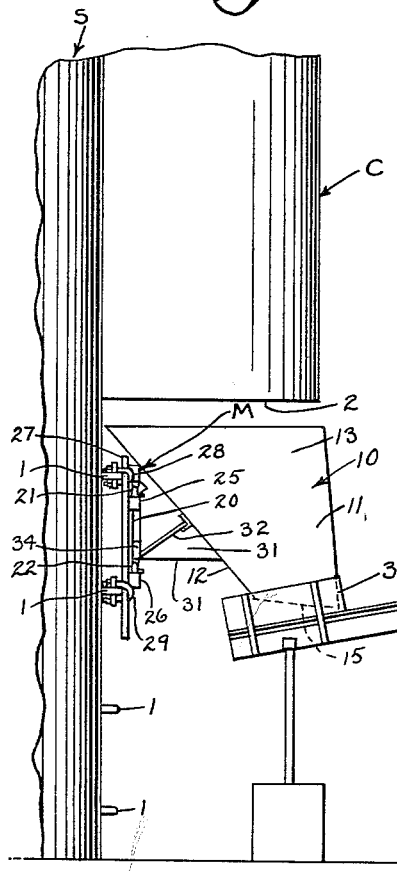
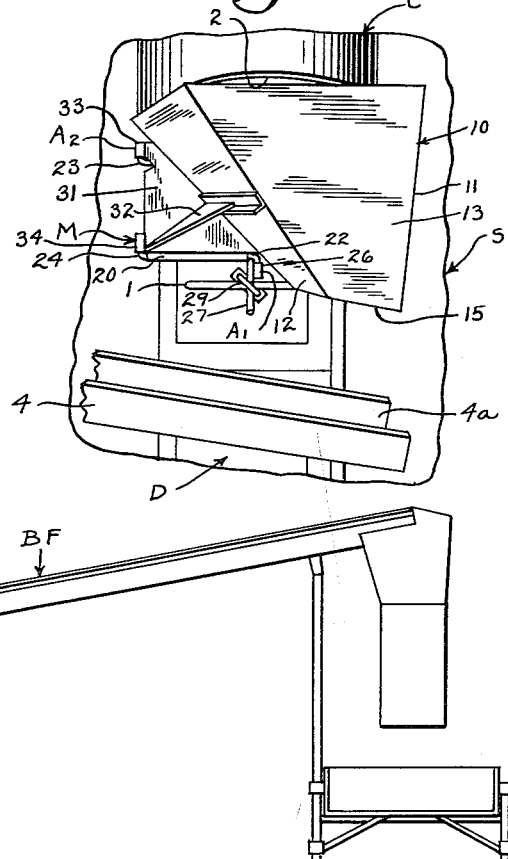
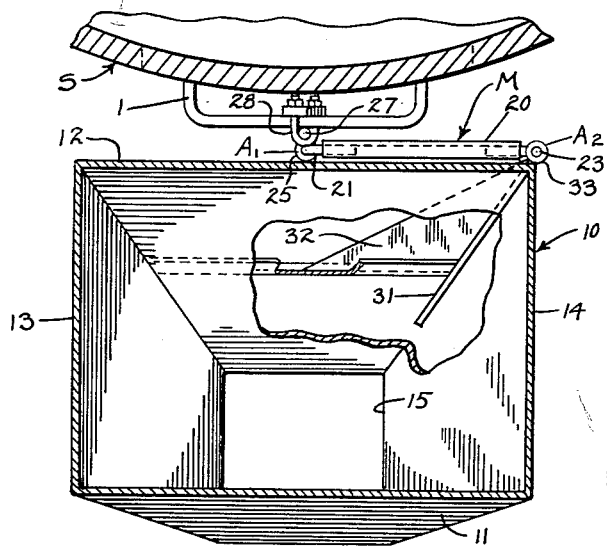
INVENTOR:
PAUL PATZ 3,169,620
SWINGABLE SILO SPOUT
Paul Patz, Pound, Wis.
Filed Apr. 1, 1963, Ser. No. 269,582
3 Claims. (Cl. 193—2)

The present invention relates generally to apparatus for handling ensilage as it falls from a silo chute, and more specifically, the invention relates to a swingable silo spout assembly which receives ensilage from the chute for directing it to other conveying apparatus, a feed cart or the like.

The present invention provides an improved swingably mounted spout assembly that is readily moved to any one of a number of positions for directing the ensilage in various directions, or that can be completely swung from beneath the chute to one side or the other for access to the ladder in the chute. In addition the spout can be swung into or out of position beneath the chute by an operator while he is on the ladder on the inside of the chute.

Another aspect of the invention relates to a spout assembly of the above type having means for attaching the spout and its entire swingable mounting to the chute ladder in any one of a plurality of lateral positions to further increase the versatility of the mounting and spout.

These and other objects and advantages of the present invention will appear hereinafter as this disclosure progresses, reference being had to the accompanying drawings, in which:

FIGURE 3 is a side elevational view of the spout position as shown in FIGURE 2, and also showing one form of conveying apparatus with which the present invention may be used;

FIGURE 4 is a perspective view taken generally from the front of the silo and showing the spout swung to a side discharge position into another conveying apparatus; and FIGURE 5 is a plan view taken generally along line 5—5 in FIGURE 2, but on an enlarged scale and with parts broken away.

Figure 1:
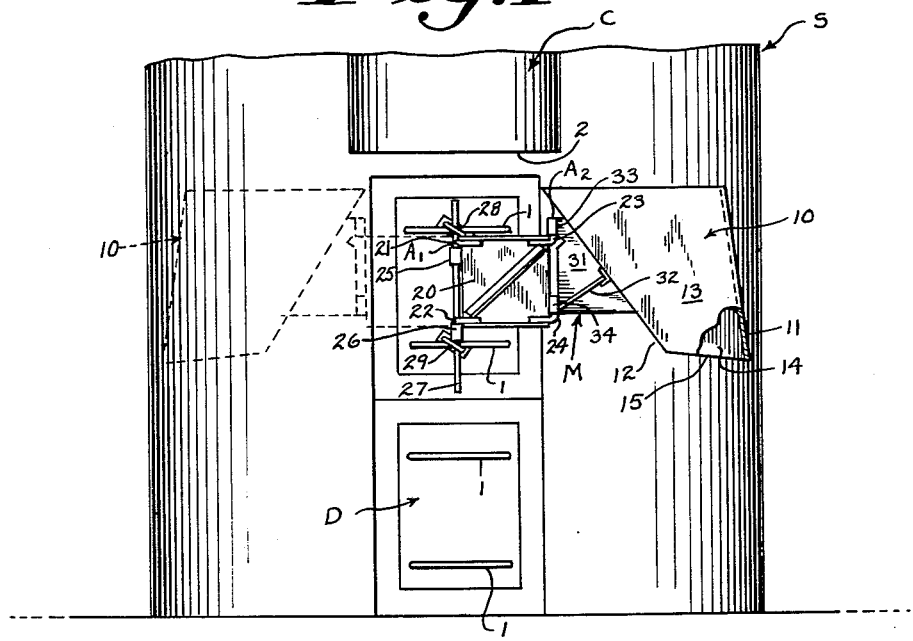
FIGURE 1 is a fragmentary front elevational view of a silo and chute with which a spout assembly made in accordance with the present invention is shown, the spout assembly being shown as swung to one side for operator access to the chute.

Referring in greater detail to the drawings, a conventional silo S has a vertical chute C extending along its side and which is in communication with the interior of the silo by means of a series of removable doors D. A ladder is formed up the silo by the steel rungs 1 which are fixed to the silo and are vertically spaced upwardly in the chute.

The ensilage (not shown) is unloaded from the top of the silo, downwardly, by being discharged into the chute where it drops out of the bottom opening 2 of the chute.

Any one of a variety of conveying means, or a combination of them may be provided beneath the bottom opening of the chute to receive ensilage as it falls from the chute.

For example, an automatic bunk feeder BF may be provided as shown in my co-pending application Serial No. 147,496, filed October 25, 1961. The receiving end 3 of such a feeder is generally located a slight distance directly outwardly from the front of the silo, as indicated in FIGURE 3.

Alternatively, a laterally extending conveyor 4 (FIGURE 4) may be located more closely to the silo, but having its receiving end 4a located slightly offset to one side of the chute.

On the other hand, it may be desirable to load directly into a push cart located on one side of the chute. In any event, it is desirable to frequently direct the ensilage to one location or the other, and these changes should be made easily. This must be done rapidly, with ease and without danger to the operator. Furthermore, the operator must be able to quickly ascend the chute ladder to adjust, inspect or otherwise operate the silo unloader (not shown) in the silo.

Figure 2:
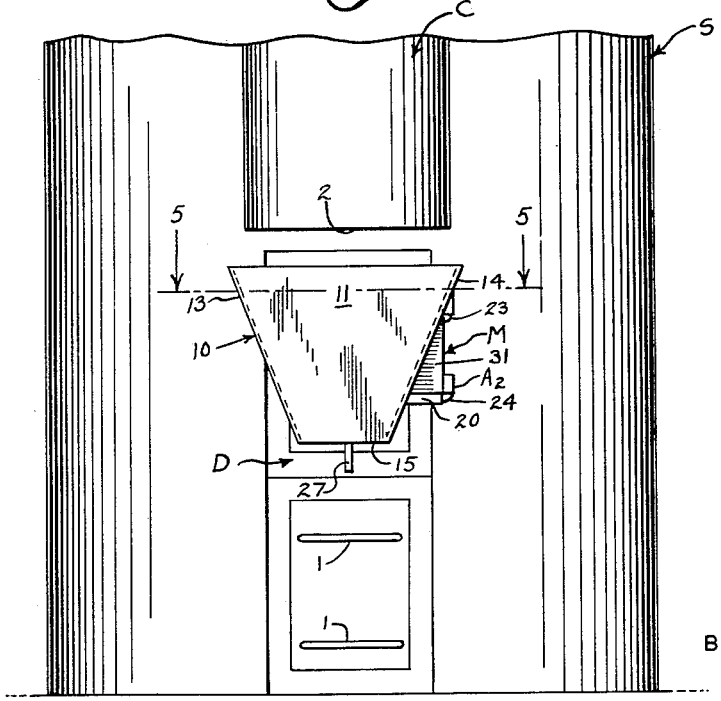
FIGURE 2 is a view similar to FIGURE 1 but showing the spout assembly as swung to the silage receiving position directly beneath the chute.

In accordance with the present invention, a horizontally swingable silo spout 10 is provided for directing ensilage from the bottom of the chute selectively to any one of a number of locations. This spout is formed from sheet metal and is of generally funnel shape, having a large upper end that completely covers the chute opening when vertically aligned therewith as shown in FIGURES 2 and 3. The width of the spout upper end is as viewed in FIGURE 2 and is large enough to cover the chute discharge end. The lower end of the spout is somewhat smaller and is offset from the silo a distance in respect to the upper end of the spout, when viewed from the side, as shown in FIGURE 3.

The offset spout 10 shown for purposes of illustrating one form of the invention, has a front wall 11, a rear wall 12 and two opposite side walls 13 and 14, all suitably and rigidly secured together, as by welding. The front and rear walls are both inclined downwardly away from the silo, when the spout is positioned as shown in FIGURE 3, and the two sides converge downwardly, to thereby form a discharge end 15 of the spout.

The spout is swingably mounted in a horizontal direction by means of a double hinge mounting M that is adjustably secured in both horizontal and vertical directions to the chute ladder. The pivot axes of the double hinge are vertical and parallel to one another. These axes are spaced apart from one another approximately a distance equal to one-half the width of the silo chute, or approximately one-half the width of the upper end of the spout. Thus the spout can be swung between the FIGURE 2 and FIGURE 4 positions without changing the position of the attachment of the assembly to the silo, as will appear.

The mounting includes an intermediate member 20 along opposite, vertical sides of which are located the pivot axes A1 and A2. These axes are formed, respectively, by the pair of downwardly turned, vertical stub shafts 21 and 22, and the pair of upwardly turned, vertical stub shafts 23 and 24.

Shafts 21 and 22 are insertable downwardly in the pair of complementary sleeves 25 and 26 which are welded to a vertical bar 27. Bar 27 is rigidly but detachably secured by U-bolt clamps 28 and 29 to any pair of the horizontal rungs 1 of the ladder. In this manner the vertical bar 27 and axis A1 formed therealong, can be moved horizontally to any position across the width of the silo chute, as the dimensions thereof or direction of swing of the spout may require.

The bar can also be adjusted vertically relative to the chute to permit the spout to be closely positioned under the discharge end of chute.

For the purpose of attaching the intermediate member 20 to the spout, the latter has a plate 31 extending outwardly at an angle from the corner between walls 12 and 14. A gusset 32 is rigidly secured between the spout wall 12 and the plate 31 for reinforcing the latter.

Along the free, vertical edge of plate 31, sleeves 33 and 34 are secured and which are insertable over the shafts 23 and 24, respectively, to form the vertical pivot axis A2 between plate 31 and the spout.

The arrangement shown in the figures permits the discharge of the ensilage laterally to one side, namely, to the right of the chute as viewed in FIGURE 4. If, however, the position of the silo or other equipment requires that the ensilage be unloaded to the other side of the silo then the pivot axis A2 would be located at the corner between walls 12 and 13. In other words, the plate 31 would be secured at the corner between walls 12 and 13 for effecting the discharge of the silage to the other side of the chute.

The position of vertical axis A2 at one or the other of the rear corners of the spout, the use of the double axis mounting and the length of the intermediate member relative to the upper end of the spout, permits the lower offset end of the spout to be easily swung to a position for discharging directly outwardly from the chute or to the side thereof. In addition the spout can be swung completely out of the way of the chute, to either side thereof. The entire mounting M can also be adjustably fixed at any one of a number of selected positions along the width of the chute to accommodate chute or silos of various dimensions, or adjoining obstacles such as walls or other equipment.

The shaft and sleeve connections at the pivot axes also permit the immediate removal of the spout and the intermediate member from the silo by simply lifting them off the vertical mounting bar which can then remain attached to the silo.

If it is necessary for the operator to be up in the silo during the unloading operation, he can climb into the chute and from that location he can then swing the spout into its proper position relative to the other conveying apparatus on the floor.

Various modes of carrying out the invention are contemplated as being within the scope of the following claims particularly pointing out and distinctly claiming the subject matter which is regarded as the invention.

I claim:

1. An ensilage directing spout assembly for a vertical silo chute of the type having a lower discharge opening adjacent a silo, said spout assembly comprising, a generally funnel shaped spout having an upper material receiving end for being positioned beneath said lower discharge opening, said spout also having a smaller lower end which is offset from said upper end, double hinge mounting means for mounting said spout to said silo for horizontal swinging of said spout relative to said chute, said mounting means including an intermediate member which is substantially one-half the width of the upper end of said spout, a first vertical pivot axis between said member and said spout and adjacent one side of said spout, said mounting means having a second vertical pivot axis spaced from said first axis and located substantially at the center of the width of said spout, and means for securing said mounting means to said silo.

2. An ensilage directing spout assembly for a vertical silo chute of the type having a lower discharge opening adjacent a silo, said spout assembly comprising, a generally funnel shaped spout having an upper material receiving end for being positioned directly beneath said lower discharge opening, said spout also having a smaller lower end which is offset from said upper end, said spout having a downwardly and forwardly inclined rear wall and downwardly converging side walls, said side wall defining a pair of rear corners with said rear wall, double hinge mounting means for mounting said spout to said silo for horizontal swinging and lateral adjustability of said spout relative to said chute, said mounting means including an intermediate member, a vertical pivot axis between said member and said spout, said pivot axis being located adjacent one of said corners, said mounting means having a second vertical pivot axis spaced from said first axis, and means for securing said mounting means to said silo.

3. An ensilage directing spout assembly for a vertical silo chute of the type having a lower discharge opening adjacent a silo, said spout assembly comprising, a generally funnel shaped spout having an upper material receiving end for being positioned directly beneath said lower discharge opening, said spout also having a smaller lower end which is offset from said upper end, said spout having a downwardly and forwardly inclined rear wall and downwardly converging side walls, said side wall defining a pair of rear corners with said rear wall, an intermediate member for mounting said spout to said silo for horizontal swinging of said spout relative to said chute, said intermediate member being of a length approximately one-half that of the width of said spout upper end, a first vertical pivot axis between said member and said spout, said pivot axis being located adjacent one of said corners, said mounting means having a second vertical pivot axis spaced from said first axis and located approximately at the center of said rear wall, and means for securing said mounting means to said silo.

References Cited by the Examiner

UNITED STATES PATENTS

| | | | |
|---|---|---|---|
| 1,934,939 | 11/33 | Manierre | 193—16 |
| 3,061,063 | 10/62 | Rutten | 193—17 |

SAMUEL F. COLEMAN, *Primary Examiner.*

ANDRES H. NIELSEN, *Examiner.*